June 23, 1970     G. WEIGELE ET AL     3,516,105
AUTOMATIC DEVICE FOR WASHING MOTOR VEHICLES
PASSING THERETHROUGH
Filed May 7, 1968     5 Sheets-Sheet 1
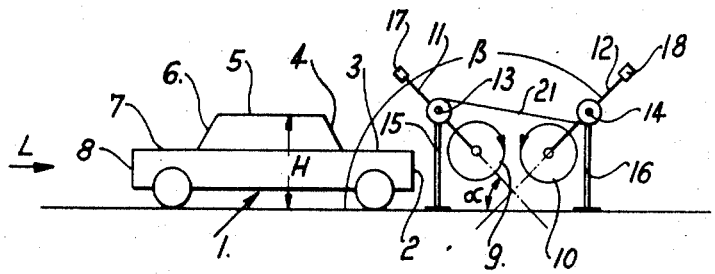
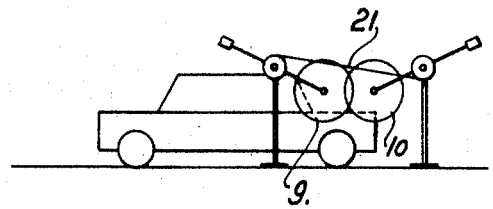
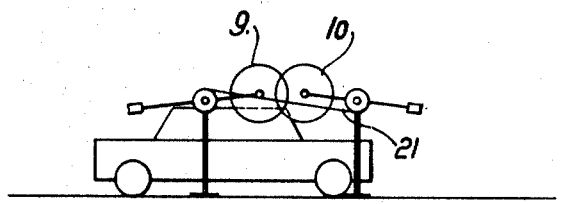
*INVENTORS*
*GEBHARD WEIGELE*
*JOHANN SULZBERGER*
BY
*Woodhams, Blanchard & Flynn*
*ATTORNEYS*

June 23, 1970     G. WEIGELE ET AL     3,516,105
AUTOMATIC DEVICE FOR WASHING MOTOR VEHICLES
PASSING THERETHROUGH Filed May 7, 1968     5 Sheets-Sheet 2

INVENTORS
GEBHARD WEIGELE
JOHANN SULZBERGER

BY
Woodhams, Blanchard & Flynn
ATTORNEYS

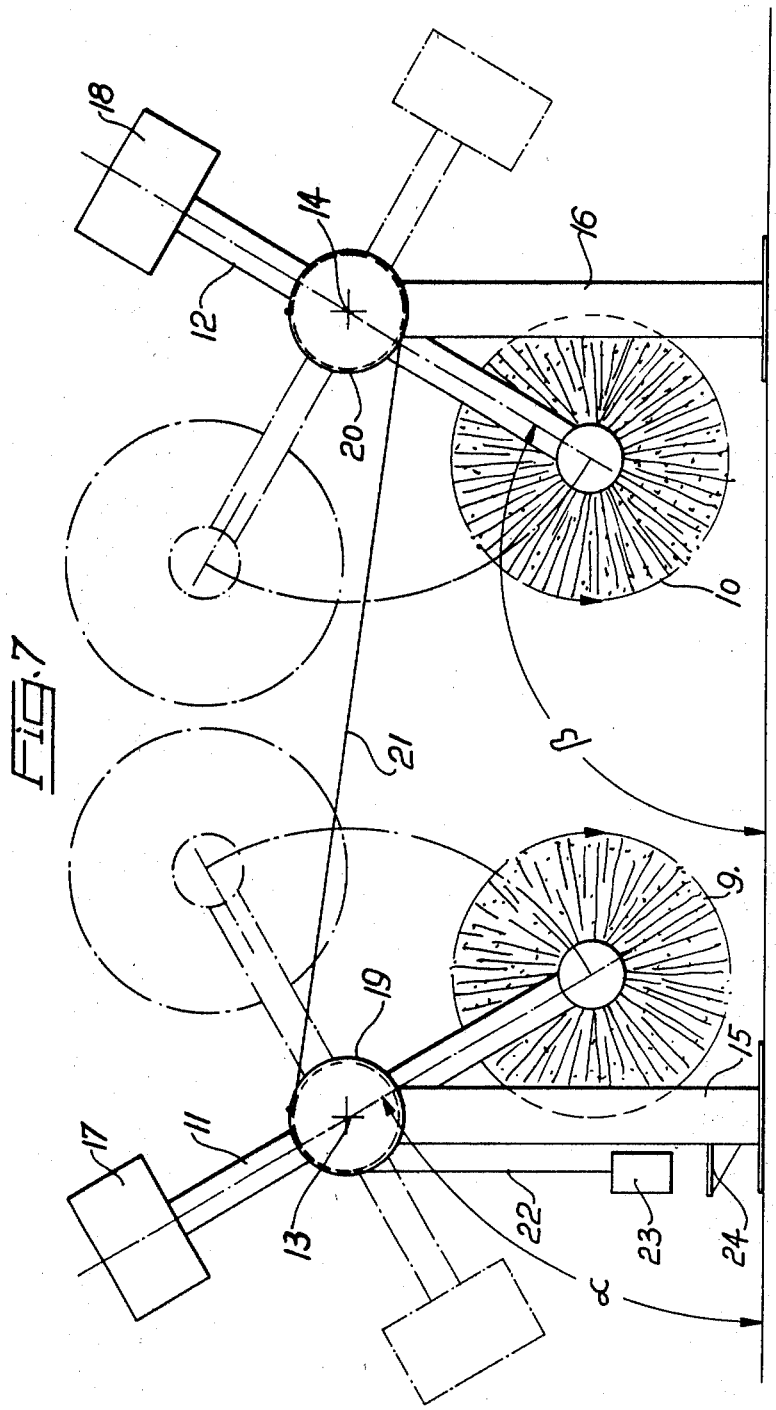

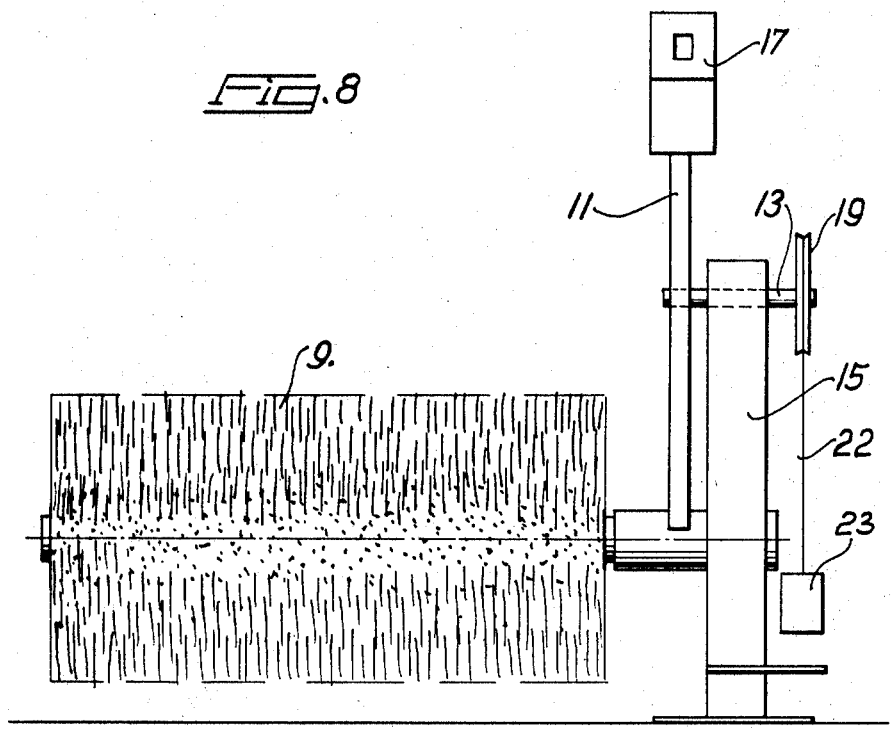

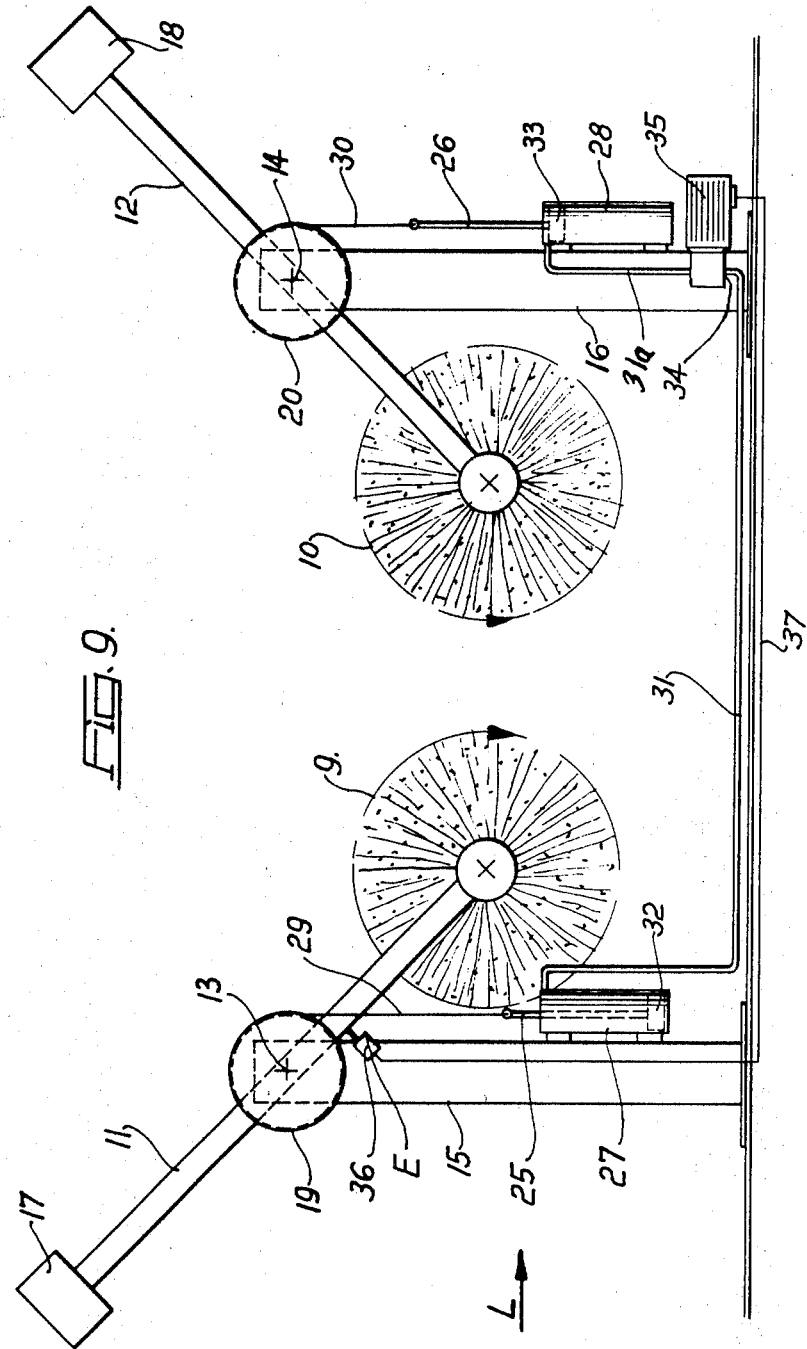

United States Patent Office 3,516,105
Patented June 23, 1970

3,516,105
AUTOMATIC DEVICE FOR WASHING MOTOR VEHICLES PASSING THERETHROUGH
Gebhard Weigele, Bussardweg 2, Augsburg, Germany, and Johann Sulzberger, Mozartstrasse 17, Steppach, near Augsburg, Germany
Filed May 7, 1968, Ser. No. 727,220
Claims priority, application Germany, Dec. 16, 1967, W 45,358
Int. Cl. B60s 3/06
U.S. Cl. 15—21      9 Claims

ABSTRACT OF THE DISCLOSURE

This invention relates to a washing device for motor vehicles of the type having a large rotating brush vertically movable by orbiting about a horizontal axis. In the device of the invention, at least two such brushes are provided, same being movable orbitally around two spaced axes and interconnected so that upward movement of the first brush to be engaged by a vehicle passing through a washing line will effect corresponding upward movement of the other brush but downward movement of said first brush will permit but not cause downward movement of the second brush.

---

This invention relates to an automatic device for washing motor vehicles passing therethrough, in particular passenger vehicles, comprising rotating brushes for washing the front, the top and the rear of each vehicle.

Automatic devices for washing motor vehicles passing therethrough are known which devices each comprise a swingable horizontal brush, the swinging lever of which is, in its basic position, inclined forwardly at an acute angle. However, by the use of such a brush, the back of the vehicle cannot be washed and the rear window of said vehicle receives at best only an insufficient wash.

The basic purpose of the invention is to overcome said deficiency and to manufacture an automatic washing device which, by using two horizontally swingable brushes, washes satisfactorily the front, the rear and also the entire top of the vehicle.

The automatic washing device of the invention is characterized by a first horizontal brush arranged on a swinging lever with a counterweight, said brush being, in its basic position, arranged in the path of the vehicle front and the swinging lever of said brush being, in its basic position, inclined at an acute angle with respect to the horizontal. The invention is further characterized by a horizontal second brush which is spaced from said first brush and arranged at approximately an equal height with respect to said first brush, the swinging lever of said second brush being, in its basic position, in contrast to the swinging lever of said first brush, inclined at an obtuse angle with respect to the horizontal. Finally, said invention is characterized by a device which, depending on the upward movement of the first brush, moves the second brush upwardly to the same extent.

The details of the invention and their advantages are discussed hereinafter with reference being made to the embodiments illustrated in the drawings, in which:

FIGS. 1–6 are side-elevational views of an automatic washing device comprising two horizontally swingable brushes in various operating positions;

FIG. 7 illustrates said washing device in an enlarged scale;

FIG. 8 is a front-elevational view of said washing device;

FIG. 9 illustrates a modified embodiment of said new washing device.

Figure 4:
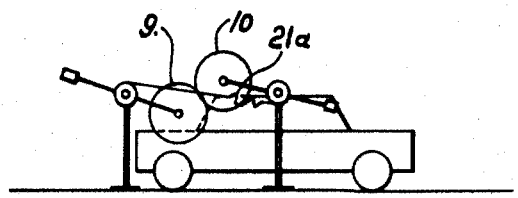

FIG. 1 illustrates a passenger vehicle at 1. The front of said vehicle is identified at 2, the hood of the motor at 3, the windshield at 4, the roof at 5, the rear window at 6, the trunk lid at 7 and the rear of the vehicle at 8. Two horizontally swingable brushes 9 and 10 are provided in a special arrangement for washing said vehicle moving in longitudinal direction L. Said brushes are arranged on swinging levers 11 and 12 which in turn are pivotable about axes 13 and 14. The stationary supports 15 and 16 which are provided for supporting said axes are of such a height that both pivot axes 13, 14 are positioned approximately at the height H of the vehicle. In order to partially balance the weight of the brushes 9 and 10, counterweights 17, 18 are provided on the swinging levers. As illustrated in the drawing, said first brush 9 is, in its basic position (FIG. 1, FIG. 7), arranged in the path of the front 2 of the vehicle whereby the swinging lever 11 of said brush is inclined at an acute angle $\alpha$ with respect to the horizontal. The swinging lever 12 of said second brush 10 which is arranged approximately at equal height in the basic position has an opposite inclination with respect to the swinging lever 11, namely, same forms an obtuse angle $\beta$ with respect to the horizontal. Furthermore, a device is provided which, depending on the upward movement of said brush 9, moves said brush 10 upwardly to the same extent. For this purpose the swinging levers 11 and 12 of the brushes are coupled so that only the upwardly swinging motion of the first swinging lever 11 which is caused by the vehicle is transferred at approximately equal amount, however, in opposite direction of rotation, to the second swinging lever 12.

Figure 5:
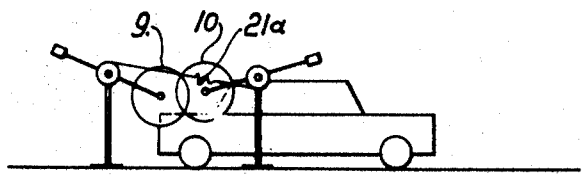
Figure 6:
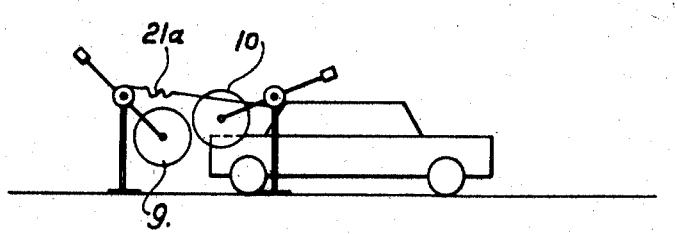

According to FIGS. 1 to 8, said coupling device is comprised of two pulleys or wheels 19, 20 mounted on the pivot axes 13, 14 and is further comprised of a cable 21 connecting said two pulleys. In the specific embodiment shown, the cable 21 is fastened to the wheel 19 and wrapped in a clockwise direction therearound so that counterclockwise movement of said wheel 19 will draw said cable onto same. Said cable 21 is at its other end similarly fastened to the drum 20 and likewise wrapped in a clockwise direction therearound so that a pulling of said cable will effect the clockwise rotation of said wheel 20. Thus, upward movement of the first brush 9 (first to be encountered by the vehicle passing through the washing line) will effect a corresponding upward movement of the second brush 10 but a downward movement of said first brush 9 will permit but not cause a corresponding downward movement of said second brush 10. This automatic washing device operates as follows:

If the vehicle front 2 during the movement of the vehicle in direction L abuts the first brush 9, said front is washed by the brush which is moved in the direction indicated by the arrow, whereby at the same time the lever 11 is displaced and the brush is moved upwardly. The second brush 10 is thereby displaced to the same extent by means of the cable coupling 19–21 so that, according to FIG. 2, both brushes finally wash the hood 3 of the motor. During the upward motion of both brushes following thereafter, according to FIG. 3, the windshield is washed only by brush 9. Then both brushes 9 and 10 which rotate in opposite directions wash the roof 5. If, according to FIG. 4, the first brush 9 slides over the rear window 6 onto the trunk lid 7 while the second brush 10 still washes the roof 5, the cable 21 is loosened during this movement as indicated with a loop at 21a. This loose coupling makes it possible that both brushes 9 and 10 move independently from one another during the downward movement. FIG. 5 illustrates that the second brush 10, due to its particularly swingable arrangement, cleans the rear window 6 of the vehicle satisfactorily and that finally, during further movement of the vehicle (FIG. 6), said brush 10 also cleans the rear 8 of the vehicle.

From the drawing, in particular FIG. 7, it can be understood that a complete cleaning of front 2 and rear 8 is achieved if both brushes 9 and 10 are arranged very low, namely, close to the ground in their basic position and accordingly also the swinging lever 11 is inclined at a large acute angle and the swinging lever 12 is inclined at a small obtuse angle. Accordingly, both swinging levers can be inclined at an angle α of 90° maximum or at an angle β of 90° minimum.

Since in the above-described operation, during the upward movement of the brushes, the second brush 10 is lifted by the first brush, a relatively strong counterpressure of said first brush 9 against the vehicle front 2 or also the windshield 4 is produced. In order to reduce said pressure or the weight of the first brush, a counterweight 23 acts on the pulley 19 with the cable 22 according to FIGS. 7 and 8. Furthermore, a resting plate 24 is provided onto which said weight rests after a partial or total upward movement of said first brush and thus becomes ineffective.

The invention is not limited to the above-described embodiment. Thus, according to FIG. 9, instead of the purely mechanical coupling of both swinging levers, a hydraulic coupling can also be provided. In this embodiment both swinging levers 11 and 12 or the pulleys 19 and 20 are each connected to the piston rod 25, 26 of a hydraulic cylinder 27, 28 by means of cables 29, 30 or the like, and said two cylinders 27, 28 are connected by conduits 31 and 31a. When the first brush 9 is displaced by the vehicle, the cable 29 pulls the piston rod 25 upwardly so that the piston 32 drives the liquid out of the cylinder 27 through the conduits 31 and 31a into the cylinder 28 and against the piston 33. Thus the piston rod 26 is moved downwardly and thus the swinging lever 12 is displaced. In order to prevent also in this case, for the above-mentioned reasons, an excessively strong counterpressure of the brush against the front 2 or windshield 4, an electrometer pump 35 is, according to FIG. 9, connected between conduits 31 and 31a at 34, said pump producing an excess pressure in the conduit 31a by which pressure the upward movement of the second brush 10 is supported. Furthermore, the illustrated embodiment comprises a time switch 36 which is operated by the swinging lever 11 of the first brush 9 to turn the pump 35 on through an electric line 37, said time switch turning off the pump 35 when the second brush 10 has reached the vehicle roof.

Although a particular preferred embodiment of the invention has been disclosed above for illustrative purposes, it will be understood that variations or modifications of the disclosed apparatus, including the rearrangement of parts, lie within the scope of the present invention.

The embodiments of the invention in which an exclusive property or privilege is claimed are defined as follows:

1. An automatic device for washing motor vehicles passing therethrough, in particular passenger vehicles, comprising rotating brushes for washing the front, roof and rear of the vehicle characterized by a first horizontal brush which is arranged on a first swinging lever with a counterweight, said brush being, in its basic position, arranged in the path of the vehicle front and the swinging lever of said brush being, in its basic position, inclined at an acute angle α with respect to the horizontal, by a horizontal second brush arranged on a second swinging lever, said second brush being spaced from said first brush and arranged at an approximate equal height with respect to said first brush, the swinging lever of said second brush being, in its basic position, in contrast to the swinging lever of said brush being, in its base position, inclined at respect to the horizontal, and by means for moving said second brush upwardly to the same extent as an upward movement of said first brush.

2. A washing devicec according to claim 1, characterized in that both swinging levers are inclined at an angle α of a maximum of 90° and at an angle β of a minimum of 90°.

3. A washing device according to claim 1, characterized in that the pivot axes of the swinging levers of both brushes, are arranged approximately at the height of the roof of the vehicle to be washed.

4. A washing device according to claim 1, characterized in that the swinging levers of both brushes are coupled so that only the upward swinging motion of the first swinging lever, which is caused by the vehicle, is transferred at approximately equal amounts, however, at opposite directions of rotation, to the second swinging lever.

5. A washing device according to claim 4, characterized in that a pulley is secured onto the pivot axes and that both pulleys are connected by a cable.

6. A washing device according to claim 5, characterized in that, in order to reduce the weight of the first brush, a counterweight acts on the pulley of said first brush and that a resting plate is provided on which said weight rests after a partial or total upward movement of said first brush.

7. A washing device according to claim 1, characterized in that each swinging lever has a hydraulic cylinder and piston associated therewith, each swinging lever being rigidly connected to a pulley and that said pulley is engaged by a cable which is connected to the piston rod of said hydraulic cylinder, said hydraulic cylinders being connected through a conduit in such a manner that upon a movement of the first brush and piston rod upwardly, the fluid is forced from the first cylinder through said connecting conduit into the second cylinder, the piston rod associated with the second swinging lever thereby being forced downwardly and therewith the second brush is swung upwardly.

8. A washing device according to claim 7, characterized in that for supporting the upward movement of the second brush, an electric motor driven pump is connected into said connecting conduit, which pump sucks in the fluid forced from said first cylinder and pumps it into the second cylinder.

9. A washing device according to claim 8, characterized in that a time switch is provided which is operated, during the upward movement of the first brush, by said first swinging lever, which time switch switches off the electric motor driven pump when the second brush has moved upwardly to the roof level of the vehicle.

References Cited

UNITED STATES PATENTS 2,881,459   4/1959   Emanuel.

FOREIGN PATENTS 877,016   9/1961   Great Britain.

EDWARD L. ROBERTS, Primary Examiner

U.S. Cl. X.R.

15—53